United States Patent [19]

Rudolph et al.

[11] 3,883,604

[45] May 13, 1975

[54] PROCESS FOR PREPARING PERFLUOROALKYLIODIDE TELOMERS

[75] Inventors: Werner Rudolph, Anderten/Han.;
Joachim Massonne, Hannover;
Horst H. Jäger, Bettingen;
Heinz Gress, Hannover, all of Germany

[73] Assignee: Kali-Chemie Aktiengesellschaft, Hannover, Germany

[22] Filed: July 8, 1971

[21] Appl. No.: 165,849

[30] Foreign Application Priority Data
July 11, 1970  Germany............................ 2034472

[52] U.S. Cl....................... 260/653.1 T; 252/431 N
[51] Int. Cl.............................................. C07c 19/00
[58] Field of Search ............................. 260/653.1 T

[56] References Cited
UNITED STATES PATENTS

| | | | |
|---|---|---|---|
| 2,770,659 | 11/1956 | Barnhart ..................... | 260/653.1 T |
| 3,006,973 | 10/1961 | Hauptschein et al. ........ | 260/653.1 T |
| 3,454,657 | 7/1969 | Decker et al. ................. | 260/653.1 |
| 3,557,224 | 1/1971 | Jaeger.......................... | 260/653.1 T |

Primary Examiner—Delbert E. Gantz
Assistant Examiner—Joseph A. Boska
Attorney, Agent, or Firm—Michael S. Striker

[57] ABSTRACT

Improved process for preparing perfluoroalkyliodide telomers by reacting perfluoroalkyliodides of lower molecular weight with perfluoroethylene or perfluoropropylene which at the most contain a single chlorine atom at a temperature of 50° to 350°C and at 0 to 200 atm, the improvement which comprises carrying out the reaction in the presence of a solid metal salt amine complex catalyst which is obtained by heating a. a metal salt of a metal of groups Ia or IIa, group IIIa of the third to the sixth period, groups IVa and Va of the fifth and sixth period and groups Ib to VIIIb of the fourth to sixth period of the periodic system or of a mixture thereof; and b. a primary, secondary or tertiary alkyl-, cycloalkyl-, aryl- or alkanol amine or a mixture thereof, using a weight ratio of metal salt to amine of 100:1 and 1:4, preferably 20:1 and 1:1.

16 Claims, No Drawings

PROCESS FOR PREPARING PERFLUOROALKYLIODIDE TELOMERS

Perfluoroalkyliodides having high molecular weights are valuable intermediate products for use in the manufacture of carboxylic acids and alcohols. Further they can be used for telomerization or for reaction with non-fluorine-containing compounds. There are obtained in this manner products which can be used as oleophobic, hydrophobic, "soil release" agents, or as hydraulic fluids.

According to Belgian Pat. No. 721,892, perfluoroalkyliodide telomers having high molecular weights have been obtained from perfluoroalkyliodides of lower molecular weight by reacting the perfluoroalkyliodide with perfluoroolefins such as for example perfluoroethylene or perfluoropropylene which at the most contain a single chlorine atom in the presence of an amine and a metal salt of a metal of groups I*b* or II*b* of the periodic system (Mendelejeff) as catalyst pair at a temperature of 50° to 350°C and a pressure of 0 to 200 atm. The catalysts described in this patent are in the form of solutions of a metal salt in the amine, the amine serving as the solvent, with the result that the amine on one hand exerts a catalytic accelerator effect on the telomerization and on the other hand also acts as a cotaxogen. As a general rule liquid catalysts on the basis of their large surfaces evidence excellent activity giving rise to high conversion degrees and favorable yields. However, the catalysts described in the aforesaid patent result in only relatively low conversions and low yields of the desired telomers. The process further is also not acceptable for the reason that following each telomerization the unreacted perfluoroethylene and the perfluoroalkyliodide must be separated off from the telomer in large amounts. Still further the crude telomerizate recovered is dark brown to black in color and has a tar-like consistency. The isolation of the desired telomer from this crude product is difficult and requires in this connection a high expenditure for apparatus. Still another disadvantage associated with the use of this type of catalyst is the low reaction velocity. Yet another unfavorable fact associated with the telomerization reaction is that at the necessary reaction temperature the amine is thermally decomposed or else takes a part in the reaction as a cotaxogen so that the effectiveness of the catalyst during the telomerization is reduced.

According to an as yet undisclosed method for preparation of perfluoroalkyliodide telomers having high molecular weights, there is described a process in which perfluoroalkyliodides having low molecular weights are reacted with perfluoroolefins in the presence of an amine and a metal salt as catalyst pair, using in place of the metal salt of the metal of group I*b* or II*b* of the periodic system, metal salts of metals of groups III*a*, III*b* to VIII*b* of the fourth to sixth period or of the groups I*a*, II*a* of the periodic system. In this case, however, the aforesaid disadvantages are still not avoided.

In accordance with the invention it has now been found that the above disadvantages are avoided if in the process for preparing perfluoroalkyliodide telomers by reaction of perfluoroalkyliodides of lower molecular weight and perfluoroethylene or perfluoropropylene which at the most contain a single chlorine atom at 50° to 350°C and 0 to 200 atm there is used as catalyst a solid metal salt amine complex catalyst which is obtained by heating a. a metal salt of a metal of groups I*a* or II*a* group III*a* of the third to the sixth period, groups IV*a* and V*a* of the fifth and sixth period, and groups I*b* to VIII*b* of the fourth to sixth period of the periodic system or of a mixture of such metal salts with b. a primary, secondary or tertiary alkyl-, cycloalkyl-, aryl- or alkanol amine or a mixture of these amines using a weight ratio of metal salt to amine of between 100:1 and 1:4, and preferably of between 20:1 and 1:1.

The catalyst, i.e. the solid metal salt amine complex, is preferably used in granular form.

The starting materials for the metal salt amine complex are advantageously halides such as iodides, bromides and in particular the chlorides of the corresponding metals. In addition the corresponding phosphates, carbonates, nitrates, sulfates, cyanides or hydrides can be used. In accordance with the invention, as metal salt component there can be used metal salts of any metal of the groups mentioned. There are preferred as metal of the group I*b* and II*b*, copper-I-, silver-, gold-, zinc-, cadmium- or mercury chloride; of group III*b* to VIII*b* of the fourth to sixth period the chloride salts of yttrium, titanium, zirconium, niobium, tantalum, ruthenium or rhodium; of groups III*a* and IV*a* the salts such as aluminum-, indium-, gallium-, thallium, tin or lead chloride. As instances of suitable salts of group I*a* there may be mentioned for example sodium and potassium salts and as illustrative of group II*a* metal salts, magnesium, calcium, strontium or barium salts.

the amines which come into consideration for use in the invention are in particular primary, secondary or tertiary alkyl-, cycloalkyl- or aryl amines. Amines which at the very least contain one oxygen atom in their molecule are preferred. Other particularly suitable amines are those which contain at least a single hydroxyl group in their molecule. Examples of suitable alkyl amines are those containing preferably 2 to 6 carbon atoms, and include N-ethylethanolamine, aminoethylisopropanolamine, preferably diethanolamine or triethanolamine and most preferably monoethanol amine.

The catalysts in accordance with the invention are obtained for example in that the amine under heating and stirring is reacted portionwise with the metal salt. The metal salts added at a temperature of between 100° and 250°C so that there is obtained a viscous pastry material. It is preferred that the warming take place at a temperature of 200°C. The catalyst following cooling is comminuted and brought into the desired form. There is preferred a globular form for the catalyst. Alternatively it is advantageous for the reaction between the metal salt and the amine to take place in the presence of an adsorbent such as for example active carbon, silica gel or aluminum oxide or after the cooling step and comminution, that the resultant material be contacted with such an adsorbent. There is thereby obtained, in addition to a finely grained catalyst, one which is additionally free flowing and capable of trickling.

As telogens there are suitable for use in the process of the invention perfluoroalkylmono- or perfluoroalkyldiiodides which can be branched or unbranched compounds. Preferably, there are preferred compounds which have 1 to 3 carbon atoms.

In many cases particularly favorable results are realized if the telomerization is carried out in the presence of a solvent. As solvent for the telomerization of perfluoroalkyliodides with perfluoroethylenes using a solid metal salt amine complex as catalyst there are suitable those substances.

a. which are with the telogens, the perfluoroalkyliodides completely miscible,
b. in which the taxogens are in far reaching amounts soluble,
c. which are completely inert, and
d. which are after the reaction easly and quantitatively recovered.

Substances which meet the aforesaid requirements are in particular saturated, perhalogenated, aliphatic and cycloaliphatic compounds such as for example trifluorotrichloroethane, hexafluorodichloropropane, hexafluorodibromopropane, dodecafluorocyclohexane, perfluoromethylcyclohexane, and preferably tetrafluorodibromomethane and trifluorotrichloroethane. As solvents there can, however, be used circulating liquid telomers having 4 to 8 carbon atoms. The advantage of using these liquid telomers lies in that under suitable reaction conditions they remain constant.

According to whether the boiling point of the telogen, the taxogen and the solvent lie under or over 60°C determines whether the telomerization is carried out in an autoclave or in a pressure-free apparatus. In the latter case, the pressure depends on the amount of the telogen, taxogen and solvent. The pressure lies between 0 and 200 atm and preferably between 10 and 100 atm. The preferred temperature range for the reaction falls between 80 and 250 degrees centigrade.

The telomerization carried out with the metal salt amine complex catalyst of the invention proceeds very rapidly and without any side-reactions occurring. In particular no darkly colored tar-like by-products are formed, as in the case where the catalyst pairs of amine and metal salt are used. The conversion of the telogen amounts to above 30%, at a conversion of the taxogen of more than 95%; the desired telomerization degree of the product mixture is a measure of the degree of conversion of the telogen. Through partial or continuous addition of the taxogen as main product, telomers having different degrees of telomerization can be recovered which, through mass spectroscopic procedures, can easily be identified. Correspondingly, the ratio of the amounts of telogen to taxogen permits the recovery as main component of perfluoroalkyliodide telomers in which 2–6 mols of perfluoroolefins have been telomerized. In small amounts there are also recovered products which only contain 1 mol of taxogen per iodine group. In the same manner, there can also be obtained products which per iodine group per mol of telogen, i.e. charged perfluoroalkyliodide contain more than 6 mols of perfluoroolefin. The type and amount of the catalyst affects the telomerization in certain limits, as for example the telomerization degree can be regulated through the pressure or the temperature. A further advantage is that the catalyst can be recovered following the conversion without any losses and reused with the same degree of activity in a further telomerization reaction. The easy separability of the catalyst has the advantage that the telomerization process can be carried out continously.

In addition to the fact that the telomerization with the catalyst in accordance with the invention is carried out substantially without loss due to friction and with great effectiveness, the catalyst of the invention, namely the solid metal salt amine complex catalysts, have as compared to the older catalyst systems such as $SbF_5$-$SbF_3$, $IF_5$-$AlCl_3$ or HF-$SF_4$ the advantage that they are not corrosive and that, accordingly, the precautionary measures associated with corrosive materials need not be taken. In comparison with the catalysts constituting organic peroxides which have been disclosed in U.S. Pat. No. 3,226,449, the catalysts in accordance with the invention have the advantage that they are easily handled.

The following examples are given in order to more clearly illustrate the invention and are in no way to be construed as limitative thereof.

EXAMPLE 1

Preparation of catalysts in accordance with the invention.

5 g ethanol amine (0.082 mol) were introduced into a porcelain dish and under warming and stirring reacted increment-wise with zinc chloride. The metal salt was added in an amount whereby at a temperature of 150°C a viscous, pasty mass resulted. The added amount of catalyst amounted to 30 g (0.22 mol). Thereafter, the catalyst mass which was obtained was allowed to cool and, following cooling, in order to obtain a granular, and tricklable catalyst, 5 g of silica gel of $Al_2O_3$ (for instance suitable for thin-layer chromatography) were added. The catalyst was then finely divided and classified into suitable fractions. The catalyst thus obtained could be used directly in a telomerization reaction.

Following the same procedure, all of the other metal salt amine complex catalysts within the scope of the invention can be prepared whereby temperatures of between 100° and 250°C can be used. In addition, mixtures of different metal salts and also of different amines can be used.

In the following example the telomerization of perfluoroalkyliodides with perfluoroolefins is described in which catalysts prepared according to Example 1 are used. The yields are given in percent and designate wt.-%.

EXAMPLE 2

40 g of a zinc chloride/ethanolamine complex catalyst were introduced into a 1-liter high-grade steel autoclave provided with a magnetic lift stirrer. The autoclave was sealed and evacuated. Thereafter 740 g pentafluoroethyliodide (3.008 mol) and 196 g tetrafluoroethylene (1.96 mol) were pressed in. At a temperature of 140°C and 48 atm the reaction set in. The reaction was maintained for 18 hours at 140°C. The pressure fell off to 28 atm. Upon degassifying, there were recovered 575 g pentafluorethyliodide.

There were then isolated from the autoclave 135 g of a white, wax-like product. By distillation and sublimation the following fractions were recovered.

| Fraction 1 | boiling point | 140–176°C | 80.1 g = 59.1% |
|---|---|---|---|
| Fraction 2 | melting point | 56– 61°C | 42.1 g = 31.0% |
| Fraction 3 | " | 128–130°C | 5.1 g = 3.8% |
| Fraction 4 | " | 155–159°C | 8.2 g = 6.1% |

Calculated on an average molecular weight of 546 the yield of telomer amounted to 36.9% of theory.

EXAMPLE 3

100 g of a mixed catalyst having the following composition
- 250 g copper-I-chloride
- 10 g titanium tetrachloride
- 10 g antimony trichloride and
- 30 g ethanol amine were introduced into a 2-liter high-grade steel autoclave equipped with a turbine stirrer. The autoclave was sealed and evacuated. Then 1,060 g pentafluoroethyliodide (4.31 mol) were introduced at 833 g tetrafluoroethylene (8.33 mol) in two portions of 416 g each was pressed in. The reaction temperature amounted to 180°C, the maximum pressure to 58 atm. The reaction was maintained for 36 hours at 180°C whereby a total pressure uptake of 59 atm was observed. On blowing off the gas, 683 g pentafluoroethyliodide were recovered.

There were then recovered from the autoclave 847 g of a white, wax-like product. Through distillation and sublimation four fractions were recovered as follows

| Fraction 1 | boiling point | 140–176°C | 327.0 g = 41.4 % |
|---|---|---|---|
| Fraction 2 | melting point | 50–54°C | 272.2 g = 34.4 % |
| Fraction 3 | " | 113–118°C | 67.7 g = 8.5 % |
| Fraction 4 | " | 151–156°C | 127.2 g = 16.1 % |

Calculated on an average molecular weight of 546 the yield of telomer amounted to 100% of theory.

EXAMPLE 4

There were introduced into a 2-liter high-grade steel autoclave equipped with a turbine stirrer 100g of a mixed catalyst having the following composition
- 250 g copper-I-chloride
- 10 g titanium tetrachloride
- 10 g antimony trichloride and
- 30 g ethanolamine After the addition of 214 g tetrafluorodibromoethane as solvent, the autoclave was sealed and rinsed with tetrafluoroethylene. 800 g pentafluoroethyl iodide (3.252 mol) were then introduced and 833 g tetrafluoroethylene (8.330 mol) in two portions of 416 g each pressed in. At a reaction temperature of 190°C within a period of 12 hours a pressure uptake of 59 atm was observed. The maximum pressure amounted to 65 atm. On degassifying, there were recovered 553 g pentafluoroethyliodide.

There remained in the autoclave 566 g of a white, wax-like product. By fractional distillation and sublimation the following four fractions were recovered

| Fraction 1 | boiling point | 140–176°C | 278.1 g = 49.1 % |
|---|---|---|---|
| Fraction 2 | melting point | 49–53°C | 176.9 g = 31.2 % |
| Fraction 3 | " | 105–112°C | 56.8 g = 10.0 % |
| Fraction 4 | " | 155–164°C | 54.4 g = 9.7 % |

Calculated on an average molecular weight of 546 the yield of telomer amounted to 100% of theory.

The charged solvent tetrafluorodibromoethane was recovered quantitatively.

EXAMPLE 5

There were introduced into a 10-liter high-grade steel autoclave equipped with a magnetic lift stirrer 300 g of a mixed catalyst having the following composition
- 250 g titanium tetrachloride
- 250 g zinc-II-chloride
- 2060 g copper-I-chloride
- 330 g aluminum trioxide and
- 180 g ethanolamine The autoclave was then sealed and evacuated. 3,160 g trifluorotrichloroethane as solvent was then introduced into the autoclave. Thereafter, 5,100 g pentafluoroethyliodide (20.731 mol) and 4,640 g tetrafluoroethylene (46.400 mol) in two portions of 2,320 g each were pressed in. The reaction temperature amounted to 170°C and the maximum pressure to 55 atm. The reaction was maintained for 40 hours at 180°C whereby a total pressure uptake of 61 atm was observed. On blowing off of the gases, 2,547 g pentafluoroethyliodide was recovered. In the autoclave there remained 3,018 g of a white, wax-like product. By distillation and sublimation the following four fractions were recovered

| Fraction 1 | boiling point | 140–176°C | 1876.0 g = 62.2 % |
|---|---|---|---|
| Fraction 2 | melting point | 50–54°C | 510.0 g = 16.9 % |
| Fraction 3 | " | 113–118°C | 432.0 g = 14.3 % |
| Fraction 4 | " | 151–156°C | 200.0 g = 6.6 % |

EXAMPLE 6

40 g of copper I chloride butyl amine complex catalyst was introduced into a 1 liter high grade steel autoclave provided with a magnetic lift stirrer. The autoclave was then sealed and evacuated. 700 g Pentafluoroethyliodide (2.848 mol) and 200 g tetrafluoroethylene (2.000 mol) were then pressed in. The reaction set in at 145°C and 53 atm. The reaction was maintained for 18 hours at 145°C. The pressure then dropped to 38 atm. Following blowing off of the gas, 630 g pentafluoroethyliodide were recovered.

There was isolated from the autoclave 64 g of a white wax-like product. Through distillation and sublimation the following five fractions were recovered

| Fraction 1 | Boiling point | 140–176°C | 21.0 g = 32.8 % |
|---|---|---|---|
| Fraction 2 | Melting point | 56–61°C | 6.1 g = 9.5 % |
| Fraction 3 | Melting point | 128–130°C | 9.4 g = 14.7 % |
| Fraction 4 | Melting point | 155–159°C | 12.4 g = 19.4 % |
| Fraction 5 | Melting point | 180°C | 15.1 g = 23.6 % |

EXAMPLE 7

Different metal salt ethanol amine complex catalysts were used for the telomerization of pentafluoromonoiodoethane with tetrafluoroethylene. The results of the telomerization reactions are set out in Table 1, which follows:

Table I

| I metal salt ethanolamine complex catalyst | wt.-ratio metal salt to amine | wt.-ratio metal salt amine complex to $Al_2O_3$ | II recovered telomer [g] | III Distillation fractions [wt.-%] | | | | IV Pressure uptake per hour [atm/hr] |
|---|---|---|---|---|---|---|---|---|
| | | | | boiling pt. 140–176°C | melting pt. 56–61°C | melting pt. 128–130°C | melting pt. 155–159°C | |
| $VCl_3$ | 1 : 0.66 | 1 : 0.10 | 140 | 68.0 | 21.9 | 6.7 | 3.4 | 0.5 |
| $TiCl_4$ | 1 : 0.33 | 1 : 0.18 | 129 | 77.2 | 12.6 | 3.9 | 6.3 | 0.8 |

Table I – Continued

| I<br>metal salt<br>ethanolamine<br>complex<br>catalyst | wt.-ratio<br>metal<br>salt to<br>amine | wt.-ratio<br>metal salt<br>amine com-<br>plex to<br>$Al_2O_3$ | II<br>re-<br>covered<br>telomer<br>[g] | III<br>Distillation fractions [wt.-%] | | | | IV<br>Pressure<br>uptake<br>per hour<br>[atm/hr] |
|---|---|---|---|---|---|---|---|---|
| | | | | boiling pt.<br>140–176°C | melting pt.<br>56–61°C | melting pt.<br>128–130°C | melting pt.<br>155–159°C | |
| CuCl | 1 : 0.07 | 1 : 0.16 | 50 | 84.0 | 8.9 | 3.9 | 3.2 | 2.2 |
| $AlCl_3$ | 1 : 0.20 | — | 78 | 79.7 | 16.1 | 1.7 | 2.6 | 2.2 |
| AgI | 1 : 0.17 | 1 : 0.14 | 254 | 73.5 | 18.7 | 4.2 | 3.8 | 4.3 |
| $MnCl_2$ | 1 : 0.21 | 1 : 0.17 | 237 | 78.5 | 16.6 | 2.8 | 1.9 | 6.0 |
| $CdCl_2$ | 1 : 0.15 | 1 : 0.13 | 164 | 78.1 | 17.0 | 2.9 | 1.9 | 6.3 |
| HgCl | 1 : 0.33 | 1 : 0.20 | 249 | 64.2 | 21.7 | 8.7 | 5.4 | 7.8 |
| $NiCl_2$ | 1 : 0.21 | — | 181 | 73.3 | 19.0 | 1.6 | 6.0 | 8.4 |
| $CoCl_3$ | 1 : 0.80 | 1 : 0.13 | 152 | 67.8 | 24.4 | 5.0 | 2.9 | 9.5 |
| $PbCl_2$ | 1 : 0.17 | 1 : 0.14 | 203 | 75.4 | 16.6 | 2.5 | 5.6 | 9.5 |
| $SnCl_2$ | 1 : 0.14 | 1 : 0.25 | 182 | 62.7 | 28.6 | 5.8 | 3.0 | 14.1 |
| $SnCl_2/NiCl_2$<br>1 : 1 | 1 : 0.25 | 1 : 0.28 | 153 | 74.0 | 15.2 | 8.0 | 2.8 | 12.5 |
| $SnCl_2/TiCl_4$<br>1 : 1 | 1 : 0.32 | 1 : 0.30 | 249 | 81.0 | 10.8 | 5.6 | 2.6 | 14.0 |
| $SnF_2$ | 1 : 0.15 | 1 : 0.26 | 180 | 62.5 | 28.8 | 5.7 | 3.1 | 14.0 |

The telomerization was carried out in a 1 liter high grade steel autoclave provided with a magnetic lift stirrer and in each case 40 grams of the metal salt ethanol amine complex catalyst were used (column I of the Table). The autoclave was sealed and evacuated and 700 g pentafluoroethyliodide (2.846 mol) and 200 g tetrafluoroethylene (2.000 mol) were pressed in. The reaction set in at 140°C and 50 atm. The reaction was maintained for 18 hours at 140°C. In this period the pressure fell to a value of between 25 and 40 atm. On blowing off of the gas unreacted pentafluoroethyliodide was recovered. There was also isolated from the autoclave a white wax-like product (col. II). By distillation and sublimation four fractions were thereby recovered (col. III). The effectiveness of the charged catalysts can be seen from the amount in composition of the recovered telomers and through the reaction velocity characterized by the pressure uptake per unit of time (col. IV).

In carrying out the Examples the tetrafluoroethylene was introduced portionwise. It is also possible, however, to introduce the tetrafluoroethylene continuously at a rate corresponding to the reaction velocity. The tetrafluoroethylene can be introduced at such a velocity that the desired pressure is still maintained in the reaction vessel. In this manner the reaction can be carried out at relatively low pressures.

What is claimed is:

1. In a process for producing telomers of a perfluoroalkyl iodide or a perfluoroalkyl diiodide which comprises reacting a perfluoroalkyl iodide or a perfluoroalkyl diiodide containing not more than three carbon atoms in its molecular structure with perfluoroethylene, perfluoropropylene, or a monochloro-substituted perfluoroethylene or a monochloro-substituted perfluoropropylene at a temperature between 50° and 350°C and a pressure between 0 and 200 atmospheres in the presence of a catalyst the improvement comprising using the catalyst in the form of particles prepared by mixing together a metal salt of the group consisting of halides, phosphates, carbonates, nitrates, sulfates, cyanides, and hydrides of sodium, potassium, magnesium, calcium, strontium, barium, copper, silver, gold, zinc, cadmium, mercury, yttrium, titanium, zirconium, niobium, tantalum, ruthenium, rhodium, aluminum, indium, gallium, thallium, lead, vanadium, maganese, nickel, tin, antimony, and cobalt, and an amine of the group consisting of primary, secondary and tertiary alkylamines, cycloalkylamines, arylamines, and alkanolamines containing at least two and at most six carbon atoms or a mixture of the said amines in a ratio by weight of the metal salt to amine between 100 : 1 and 1 : 4, heating the mixture of said metal salt and amine at a temperature between 100° and 250°C, and, after cooling the catalyst mixture, comminuting the same.

2. A process as defined in claim 1 in which the ratio by weight of the metal salt to amine that are used to prepare the catalyst is between 1 : 1 and 20 : 1.

3. Process according to claim 1, wherein said metal salt amine complex catalyst is formed by heating said metal salt and amine at a temperature between 100° and 200°C.

4. Process according to claim 1 wherein said metal salt is a metal halide.

5. Process according to claim 1 wherein said metal salt is a metal chloride.

6. Process according to claim 1 wherein said amine is an alkanol amine.

7. Process according to claim 6 wherein said alkanol amine is ethanol amine.

8. Process according to claim 1 wherein said catalyst additionally contains an adsorbent selected from the group consisting of active carbon, silica gel and aluminum oxide.

9. Process according to claim 1 wherein as telogen starting material a perfluoroalkylmono iodide is used.

10. Process according to claim 1 wherein said reaction is conducted in the presence of a saturated perhalogenated aliphatic or cycloaliphatic compound.

11. Process according to claim 10 wherein said saturated perhalogenated aliphatic or cycloaliphatic compound is tetrafluorodibromoethane or trifluorotrichloroethane.

12. Process according to claim 1 wherein said metal salt is a member selected from the group consisting of $VCl_3$, $TiCl_4$, CuCl, $AlCl_3$, AgI, $MnCl_2$, $CdCl_2$, HgCl, $NiCl_2$, $CoCl_3$, $PbCl_2$, $SnCl_2$, $SnCl_2/NiCl_2$, $SnCl_2/TiCl_4$, $SnF_2$, $ZnCl_2$, $CuCl/TiCl_4/SbCl_3$ and $CuCl/SnCl_2/TiCl_4$.

13. The process of claim 1 wherein the amine employed in preparing the catalyst is N-ethylethanolamine, aminoethylisopropanolamine, monoethanolamine, diethanolamine or triethanolamine.

14. The process of claim 1 wherein said telomerization reaction is carried out in the presence of a solvent.

15. The process of claim 14 wherein the solvent is formed by liquid telomers of 4 to 8 carbon atoms.

16. The process of claim 15 wherein the liquid telomers are circulated through the reaction mass.

* * * * *